United States Patent Office 3,537,867
Patented Nov. 3, 1970

3,537,867
ATMOSPHERIC STERILIZATION
George Glasser, Ossining, and Joseph Cseri, North Tarrytown, N.Y., assignors to General Foods Corporation, White Plains, N.Y., a corporation of Delaware
No Drawing. Filed Jan. 23, 1968, Ser. No. 699,774
Int. Cl. A23b 7/00, 1/00
U.S. Cl. 99—186                                         7 Claims

ABSTRACT OF THE DISCLOSURE

Food is sterilized under ambient atmospheric condition by immersion in a polyhydric alcohol solution under conditions which do not reduce moisture content below 45% and is then aerobically canned.

---

This invention relates to the sterilizing and canning of food products. More particularly it is concerned with a method whereby food products can be treated at high temperatures under conditions which avoid development of undesired flavors and/or colors or other loss of food values.

Conventional canning operations involve a prolonged heat treatment dependent upon heat transfer conditions dictated by package dimension and type of product mass. Concomitant to requisite product and package sterilization there is a significant deterioration in flavor and taste values of the food and over-all organoleptic qualities of the food product suffer. This deterioration can be ascribed to a number of processes; to wit, caramelization, protein denaturation, deterioration of edifying food additives like spices and overall textural breakdown. The size of the can prolongs the ability of heat required for sterilization to be uniformly transferred through the can and to the goods therein; for large No. 10 cans and higher numbered size the differential becomes more detrimental to the product.

More recently workers have advanced the proposition that variations in food values stemming from variations in heat transfer can be minimized by employing so-called "hyperbaric" conditions whereby the product is subjected to superatmospheric pressure for comparatively shorter periods of time than conventional sterilization until a lethal treatment of bacteria present is effected, generally at temperatures in the order of 250° F. and up. The commonly stated purpose of such super atmospheric pressure is to raise the boiling point of the cooking solution associated with the goods in the can, or prior to insertion in the can. Typically such hyperbaric treatment calls for serially charging a ham, or like meat product, to a 20 p.s.i. chamber wherein the specimen is heated to 250° F. at which time it is immediately canned and held for a few minutes, the can inverted to sterilize can ends, and the can then immediately cooled to minimize heat deterioration. Such hyperbaric treatment is said to avoid development of unnatural or undesirable flavors, colors and textures while imparting fresh appearance and clean aromas to the product. This practice has met with comparatively limited success mainly by reason of the large investment in capital and operating expense required for practicing continuous hyperbaric conditions.

It is the object of the present invention to provide a process which eliminates the ungainly expense of such hyperbaric processes while at the same time offering the cooked flavor, aroma, texture and appearance advantages of said hyperbarically treated products.

Briefly stated, the present invention involves immersion of the cannable food such as a ham in a polyhydric alcohol solution such as a polyhydric alcohol like glycerol and having a specific heat substantially less than that of water under ambient atmospheric conditions whereby the foodstuff is minimally dehydrated but rapidly elevated to a sterilizing temperature in the neighborhood of 250° F. and for a brief time period which avoids organoleptic deterioration of the food values specified hereinabove, the thus sterilized food being thereafter canned in a conventional manner. By employing a sufficient concentration of polyhydric alcohol to raise the boiling point of liquids present in the food and the cooking solution and assuring that the comparative specific heat of the polydric material and other low molecular weight solutes such as sugars and salts that may be present are sufficiently less than that of water, the foodstuff can be reduced to a substantially pathogen-free bacterially stable form for canning. Generally, such treatment will involve the conjoint use with the polyhydric material of sugar, salt and other solutes compatible to the ultimate flavor, aroma and food value intended.

Boiling points of sterilizing solutions can be raised to the greatest degree by the inclusion of solutes with two major characteristics:

(a) Low molecular weights; and
(b) Multiple ion generation (when solubilized in water).

Fulfilling the above would be salts such as:

KCl    CaCl₂    Na₄P₂O₇    K₃PO₄

In the case of sugars where no ions are generated, low molecular weights alone are the determining factor for maximum effect. Therefore glucose, fructose, and sorbitol are better than sucrose, and sucrose is better than maltose.

Other high boiling solutes serving in this capacity and offering a flavoring effect are:

Allyl cyclohexanepropionate—(Pineapple aroma)
Allyl ionone—(Good for ham products)
Amyl butylate—(B.P. 362° F.)
Benzyl alcohol—(B.P. 205° C.—402° F.)
Carvacrol (pungent, spicy good for exotic dishes)—B.P. 238° C.—460° F.)
Citral—(B.P. 229° C.—445° F.) Viscosity increases with time.

These latter high boiling flavoring solutes would be used at .05–.1% maximum level in the sterilizing solution, whereas the salt may be employed at a level of 0–3% and the sugar at a level of 0.20% depending on flavor; usually a salt level of 1–3% and a sugar level of 5–15% alone or in combination with the salt will be suitable to further increase the boiling point of the sterilizing solution to an extent compatible with organoleptic acceptability.

The commercial sterilization practice of the present invention will generally call for a comparatively abbreviated heat treatment of no more than 20 minutes duration and usually in excess of 5 minutes, during which time the moisture content of the foodstuff which will generally be reduced from 60% and above to one in excess of 45%; thus, the food will undergo a loss in moisture no greater than a minor weight percent of the moisture therein prior to such commercial sterilization. It is a characterizing feature of the present invention and one which gives commercial advantage to it, that the commercial sterilization practice can be carried out under atmospheric pressures, or in any event at pressures no greater than but a few pounds per square inch above atmospheric, so that for practical purposes the invention will be practiced under normal ambient atmospheric pressures.

To achieve such commercial sterilization conditions the concentration of polyhydric alcohol in the treating solution will be sufficiently high so that the overall effects of heat treatment will cause the boiling point of the sterilizing solution to generally exceed 230° F. and typically be in the neighborhood of 250° F., boiling points referred to herein being understood to be measured at ambient atmospheric conditions. An illustrative embodiment calls for the immersion of the foodstuff in an aqueous glycerol solution which may contain sugar, salts or other water-soluble solutes of the types listed above, the heat treatment being carried on until the thorough kill intended has been effected. Most preferably and advantageously, commercial sterilization will be practiced in the can or other package whereby the glycerol is caused to infuse the foodstuff and undergo an exchange for a minor fraction of the water present therein. In like measure, food grade acidulents such as citric acid or ascorbic acid and the like may be added to the sterilizing solution to further advance bacteriostasis in the food prior to packing thereof.

Products commercially sterilized in accordance with the present invention are intended to be anaerobically packaged atmospherically, e.g., inserted in the package while still at an elevated sterilizing temperature and ultimately hermetically sealed. Indeed it is a major advantage in the present invention that as distinguished from prior art hyperbaric operations and the limitations of such art referred to hereinabove, the sterilized foodstuff while still at a sufficiently elevated temperature—say above 220° F.—can be transferred to the sealable package and inserted therein at such temperature and under such conditions that the foodstuff loses its sensible heat and causes the package per se to be sterilized while at ambient atmospheric pressures. Ultimately the packaging material, be it a can, plastic pouch, glass jar or other suitable material forming no part of the present invention, is closed to effect a hermetic seal, preferably before the foodstuff has undergone a loss in temperature to less than 212° F. and more preferably above 230° F., it being most preferred to maintain a product temperature of 250° F. or above prior to hermetic sealing. The terminal temperature just prior to hermetic packaging will be dependent to some degree upon any other bacteriostasis mechanisms present and operative to effect or assure sterilization, such the use of solutes, such as acids and sugars, or the use of bacteriostats, all of which are similarly within the purview of a man's skill in the art. Customarily, the package will be immediately sealed as quickly as possible after insertion of the hot foodstuff therein and will be caused to receive sensible heat from the foodstuff, whereafter it should be quenched once a minimum holding period of say two minutes has expired; usually the sealed container will be inverted, rolled or otherwise manipulated to maximize heat sterilization of the container. Finally the high temperature-sealed product will preferably be cooled rapidly by immersion or spraying with cold water or other functional heat transfer medium to arrest organoleptic deterioration of the packaged product.

The spirit of the present invention, therefore, calls for the employment of a sufficiently high concentration of neutral, edible, liquifiable, polyhydric material eminent among which is glycerol and sorbitol with perhaps less levels of propylene glycol, as a major weight percent of a sterilizing solution into which the foodstuff is immersed and by reason of which it is caused to undergo a small degree of moisture reduction—say in the neighborhood of 10- to 20% of original moisture control of the food prior to sterilization, such moisture reduction being a function of the concentration of polyhydric material, the sterilizing solution and the sterilizing temperature elevation required to achieve reduction of bacterial loading preparatory to canning. The polyhydric material advantageously has a sufficienly low specific heat that the overall period required to achieve a sterilizing temperature target will be reduced to that of water, it being appreciated that water could not reach the sterilizing temperature of 250° F. at atmospheric conditions. The rapid transfer of heat effected by such temperature elevation and directly relatable to the comparatively reduced specific heat of the sterilizing solution constituents will assure that the product will be uniformly heated such that any changes induced in the product will be predictably effected and not localized in character. A collateral benefit stemming from the present invention is that comparative solubility of many added solutes employed for either bacteriostasis or product characterization, be it flavor enhancement, color change or the like, will be less soluble in the polyhydric alcohol employed than in water such that as the product is caused to undergo sterilization under atmospheric conditions such solutes will ge preferentially dissolved in remaining product moisture and thereby effectively increase in functionality.

Preferably glycerol or sorbitol solution or mixtures thereof are employed in the stabilizing solution since it is found that such materials also offer desired lubricity in partial substitution for the water of the produce, be it a meat cut such as a ham or other foodstuff, particularly when the product moisture is not caused to undergo a significant moisture reduction to less than 50%; such products may be eaten "as is" that is, when discharged from the can or other package, or when prepared for ultimate consumption can be rewetted under which recipe the polyhydric alcohol will undergo a transfer in the recipe solution and thus be depleted to revert to an intended organoleptic value of high preference.

Among foods that may be advantageously treated in the present invention are poultry, such as chicken, ham, beef; vegetables such as peas, carrots and like produce, and food solids generally. The polyhydric alcohol of use in treatment of such foodstuff should be in a liquid state within the sterilizing temperature range contemplated so as to provide desired transfer of water from the foodstuff incident to commercial sterilization and also to offer to the product lubricity of texture. Most representative therefore of the polyhydric alcohols solution of use will be those high in glycerol and/or propylene glycol levels, although other polyhydric alcohols may be similarly employed and indeed comparatively non-liquid polyhydric alcohols may be employed in a minor percentage of such preferred polyhydric materials. For acceptability propylene glycol should be used at a comparatively low level vis-a-vis glycerol.

The mass of the sterilizing solution and the foodstuff being treated should be such that the overall effect is to assure that the terminal sterilizing temperature in excess of 212° F. will be attained after a period of heat treatment substantially less than 20 minutes, whereby water evaporation in the product will preferably not exceed 20% of the weight of the original product moisture, and generally will not be so prolonged as to occasion a moisture reduction in the product to below 45%. By reason of such concentration of sterilizing solution containing optionally sugars, salts, acidulants, and other solutes, as well as the polyhydric alcohol, sterilizing temperature of the food will be achieved comparatively rapidly.

The preferred commercial practice of the invention will be a simple, in line continuous treatment wherein the foodstuff, be it meat or vegetable, will be blanched and/or cooked to the desired degree of acceptability intended, as well as the desired degree of heat treatment at which th product may be most advantageously packaged and marketed. Such blanching and/or cooking form no part of the present invention and may be carried out prior to immersion in the commercial sterilizing solution, although it is within the ambit of the present invention that commercial sterilization may be effected in the same vessel used to partially or completely cook the food. Thus, the use of a polyhydric alcohol such as glycerol, may be relied upon to employ a terminal degree of cook to the meat and/or vegetable, although the usual practices of the present invention will involve a separate use of a commercial sterilizing operation, which operation can be performed either prior to or incident to packaging in a continuous line operation, the advantages of which will be apparent to those skilled in the art being no longer hindered by the necessity of operating under hyperbaric conditions. Thus the sterilized food product may be inserted while still hot in a can, jar, pouch or any other hermetically sealable packaging material under atmospheric condtions wherein the heat of the product will sterilize the container, the product being held in the sealed container for a minimum time to sterilize the container say (2 minutes), and immediately quenched to retain all the desired attributes of color, flavor, texture, etc.

This invention will now be more fully described by reference to the accompanying example.

Canned chicken-vegetable product: A batch for canning a chicken and vegetable mixture was prepared as follows:

CHICKEN TYPE STERILIZING SOLUTION

| Ingredients | Grams per batch | Percent |
|---|---|---|
| Glycerin | 4,282.08 | 84.57 |
| Chicken flavored soup base (equal parts of monosodium glutamate, salt and sugar) | 535.26 | 10.57 |
| Propylene glycol | 133.82 | 2.64 |
| Salt | 7.70 | 0.15 |
| Sugar | 40.00 | 0.79 |
| Citric acid | 25.00 | 0.49 |
| K sorbate | 40.14 | 0.79 |
| | 5,064.06 | 100.00 |

FOOD SOLIDS TO BE STERILIZED

| Ingredients | Grams per batch | % |
|---|---|---|
| Chicken, raw cut in strips | 450.00 | 72.00 |
| Carrots, raw diced | 125.00 | 20.00 |
| Potatoes, raw diced | 43.80 | 7.00 |
| | 625.00 | 100.00 |

2,000 cc. of the above sterilizing solution were placed in a steam-jacketed heating kettle. 625 grams of the food solids chicken-vegetable product mixture were added to the aforementioned solution which was elevated to a boiling temperature after addition of the ingredients to be sterilized.

The raw produce in the batch above was heated with constant stirring in the sterilizing solution to a temperature of 252° F. in 12 minutes. Thereafter free liquid was decanted until the major percent of the batch was composed of solid product, there being just sufficient liquid left in the batch to provide heat for transfer to sterilize the acn into which the batch was to be charged. The batch was inserted into a #1 tinplated steel can and was sealed immediately, inverted for 2 minutes to sterilize the can per se and immediately cooled in an ice bath. The product was stored for one week at 100° F. and was then tested for bacteriology assays. The canned product had a standard plate count a thermophile content of 30, permitting it to be judged bacteriologically clean. This product when stored in a canned form is commercially sterile indefinitely. The product when discharged from the container was appealing appearancewise. The peas and carrots retained their natural color. No caramelization aromas emanated from the product. The textures of the peas, carrots and chicken pieces were firm and there was no evidence of any significant loss of textural qualities. The product was comparatively free of any metallic character emanating from the can.

While the invention has been described with reference to a specific operative example, its scope is to be understood to be of such character as to embrace a variety of meats and/or vegetables and mixtures thereof which may similarly be commercially sterilized, and accordingly the invention is to be understood in the light of the accompanying claims.

What is claimed is:

1. Process for commercial sterilization of foodstuffs which comprises treating said foodstuff at a moisture content in excess of 60% under conditions which effect a lethal treatment of bacteria present consistent with anaerobic packaging of the foodstuff by immersing the foodstuff in a polyhydric alcohol-containing sterilizing solution and elevating it to a sterilizing temperature of above 220° F., in a period less than 20 minutes, the relative mass of the commercial sterilizing solution and the foodstuff being such that the requisite sterilization is effected without causing the foodstuff to undergo dehydration to a moisture content less than 45%; and thereafter aerobically and hermetically sealing the thus sterilized foodstuff in a hermetic package at a temperature in excess of 212° F.

2. Process according to claim 1 wherein the polyhydric alcohol comprises a major weight percent of the sterilizing solution used and the solution has a boiling point in excess of 230° F., said lethal treatment being carried out under substantially atmospheric pressure.

3. Process according to claim 2 wherein glycerol is employed as a principal constituent of the polyhydric alcohol in the sterilizing solution.

4. Process according to claim 1 wherein the sterilized foodstuff is transferred to the package under ambient atmospheric pressure and at an elevated temperature sufficient to sterilize the package.

5. Product of the process of claim 1.

6. Process according to claim 1 wherein the sterilizing solution has added thereto solute materals in amount effective to further increase the boiling point of the solution above that of a comparable solution from which said solute materials are absent.

7. Process according to claim 6 wherein said solute materials are selected from the class consisting of salts, sugars and mixtures thereof.

References Cited

UNITED STATES PATENTS

| 3,183,102 | 5/1965 | Malecki | 99—186 |
| 3,232,770 | 2/1966 | Schack et al. | 99—186 |
| 3,275,452 | 9/1966 | Rllen | 99—107 |

TIM R. MILES, Primary Examiner

U.S. Cl. X.R.

99—187